United States Patent [19]

Oishi et al.

[11] 4,029,933

[45] June 14, 1977

[54] METHOD OF VERTICAL WELDING OF ALUMINUM AND ALUMINUM ALLOYS

[75] Inventors: Minoru Oishi; Naoki Okuda, both of Fujisawa; Makoto Tomita, Yokohama; Nobumasa Ohkubo, Yamato; Kazuo Kogane; Kazuo Yonezawa, both of Kamakura, all of Japan

[73] Assignee: Kobe Steel Ltd., Kobe, Japan

[22] Filed: Feb. 10, 1975

[21] Appl. No.: 548,624

[30] Foreign Application Priority Data

Nov. 14, 1974 Japan .................... 49-131728

[52] U.S. Cl. .................. 219/126; 219/73 R; 219/124; 219/125 R; 219/125 PL

[51] Int. Cl.² .................................. B23K 9/12

[58] Field of Search ............ 219/73 R, 124, 125 R, 219/125 PL, 126

[56] References Cited

UNITED STATES PATENTS

| | | | |
|---|---|---|---|
| 1,933,340 | 10/1933 | Raymond | 219/124 |
| 3,296,412 | 1/1967 | Waite et al. | 219/126 |
| 3,582,608 | 6/1971 | Ito et al. | 219/126 X |
| 3,742,184 | 6/1973 | Arikawa et al. | 219/126 |
| 3,832,522 | 8/1974 | Arikawa et al. | 219/125 R X |
| 3,839,619 | 10/1974 | Normando et al. | 219/126 |
| 3,843,866 | 10/1974 | Kensrue | 219/124 |

Primary Examiner—J. V. Truhe
Assistant Examiner—N. D. Herkamp
Attorney, Agent, or Firm—Oblon, Fisher, Spivak, McClelland & Maier

[57] ABSTRACT

A method of vertical welding of aluminum and aluminum alloys comprising welding Al or an Al alloy while oscillating in a welding groove an electrode in a closed pattern corresponding substantially to the groove shape, wherein the welding is conducted by using a welding current higher by 10 to 150 A than the base welding current at least during the course of oscillation of the electrode along the groove face of one of the materials to be welded while the electrode is pursuing courses of oscillation along both groove faces of the materials to be welded.

7 Claims, 8 Drawing Figures

METHOD OF VERTICAL WELDING OF ALUMINUM AND ALUMINUM ALLOYS

BACKGROUND OF THE INVENTION

1. Field of the Invention

This invention relates to a method of vertical welding of aluminum and aluminum alloys, and more particularly to an improvement in the method of vertical welding of aluminum and aluminum alloys while oscillating in a welding groove an electrode in a closed pattern corresponding substantially to the groove shape.

2. Description of the Prior Art

In the method of vertical welding of aluminum and aluminum alloys, a deltaic (triangular) oscillating pattern is usually adopted, for example, for V-groove welding. There has been proposed a method in which a vertical butt joint of large aluminum structures of a relatively large thickness is welded by oscillating an electrode along the deltaic pattern according to MIG welding performing the vertical ascending welding effectively with a reduced number of layers, as disclosed, for example, in *Petrochemical Engineering*, 5, 9, pp. 73–79 (1973). In such a conventional welding method, however, since the welding is conducted by applying a certain prescribed welding current throughout oblique sides (portions corresponding to groove faces) of the deltaic pattern and the bottom side (the portion corresponding to the open side of the groove), because of the high thermal conductivity of the material to be welded, especially in the case of aluminum alloys, insufficient weld penetration results caused.

SUMMARY OF THE INVENTION

It is therefore an object of this invention to provide a method of vertical welding of aluminum and aluminum alloys in which good weld penetration can be obtained on the groove faces.

A further object of this invention is to provide a method of vertical welding of aluminum and aluminum alloys in which sagging of the weld metal is prevented when the portion along the surface of a material to be welded on the open side of the groove is welded.

A still further object of this invention is to provide a method of vertical welding of aluminum and aluminum alloys in which a good weld metal free of weld cracks such as micro-cracks can be obtained.

In accordance with a first aspect of this invention for attaining the foregoing and other objects, there is provided a method of vertical welding of aluminum and aluminum alloys while oscillating in a welding groove an electrode in a closed pattern corresponding substantially to the groove shape, wherein the welding is conducted by using a welding current higher by 10 to 150 A than the base welding current at least during the course of oscillation of the electrode along the groove face of one of the materials to be welded while the electrode is pursuing courses of oscillation along both groove faces of the materials to be welded.

In accordance with a second aspect of this invention, there is provided a modification of the welding method of the first aspect wherein the welding is conducted by using a welding current higher by 10 to 150 A than the base welding current throughout the courses of oscillation of the electrode along all the groove faces of the materials to be welded while the electrode is pursuing courses of oscillation.

In accordance with a third aspect of this invention, there is provided a modification of the welding method of the first aspect wherein the angle formed between electrode and the molten face on the center of the groove is at least 90° or larger.

In accordance with a fourth aspect of this invention, there is provided a modification of the welding method of the second aspect wherein during the courses of oscillation of the electrode along all the groove faces of the materials to be welded the welding is conducted by using current higher by 10 to 60 A than the electric current applied during the course of oscillation of the electrode along the open side of the groove.

In accordance with a fifth aspect of this invention, there is provided a modification of the welding method of the fourth aspect wherein the amount of arc heat during one cycle of oscillation of the electrode is 4 to 19 kilojoules and the oscillation frequency is 30 to 120 cycles per minute.

In accordance with a sixth aspect of this invention, there is provided a modification of the welding method of the first aspect wherein the angle of the electrode with respect to the plane perpendicular to the base metal is not greater than 5° in portion below the plane and not greater than 30° in the portion above the horizontal plane.

In accordance with a seventh aspect of this invention, there is provided a modification of the welding method of the first aspect wherein the electrode is oscillated at a speed of 2 to 15 m/min.

BRIEF DESCRIPTION OF THE DRAWINGS

Various other objects, features and attendant advantages of the present invention will be more fully appreciated as the same becomes better understood from the following detailed description when considered in conjunction with the accompanying drawings, in which like reference characters designate like or similar parts throughout the several views and wherein.

DETAILED DESCRIPTION OF THE PREFERRED EMBODIMENTS

As a result of research conducted by the present inventors with a view to solving problems involved in vertical ascending welding of aluminum and aluminum alloys, it was found that when, during courses of oscillation of an electrode along the groove faces, the welding is conducted by applying a welding current higher than the welding current applied during the course of oscillation along the open side of the groove, good penetration can be obtained on the groove faces. In contrast, when a higher electric current is applied during the course of oscillation of the electrode along the open side of the groove, the temperature of the molten metal becomes too high and sagging of the weld metal occurs. Accordingly, it is necessary to conduct the welding during this course of oscillation by applying a relatively low current. According to this welding method, even when a high current is applied only during the oscillation course where melting of the groove face is insufficient, the weld penetration on the groove face is highly improved over the weld penetration attained by the conventional method.

Accordingly, this invention provides an improvement in the method of vertical welding of aluminum and aluminum alloys wherein the welding is conducted while oscillating in a groove an electrode in a closed pattern corresponding to the groove shape (for example, deltaic, square, pentagonal and circular shapes), the improvement being characterized in that the welding is conducted by applying a higher current at least during the course of oscillation of the electrode along the groove face of one side of a base metal while the electrode is pursuing courses of oscillation along the groove faces of both sides of the base metal.

In practicing this invention, when, for example, a V-groove is welded, an electric circuit for application of an additional current is disposed in the deltaic oscillation mechanism, and at the point where the electrode shifts from the bottom side of the oscillating delta to the oblique side of the delta, the additional current is applied and the welding is conducted with a welding current corresponding to the sum of the base welding current and the additional current. When the electrode pursues its courses of oscillation and arrives at the starting point of the course of oscillation along the bottom side of the delta, the welding is conducted again with the base welding current alone. These procedures are repeated with respect to each cycle of oscillation to complete the welding.

Figure 1:
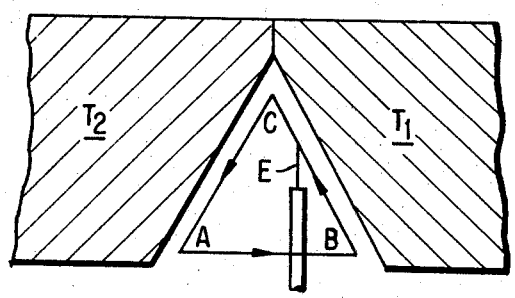
FIG. 1 is a view illustrating courses of deltaic oscillation of the top end of an electrode in a V-groove.

The method of this invention will now be described in detail by reference to the attached drawings, and more particularly to FIG. 1 which illustrates courses ABC of deltaic oscillation of an electrode in a V-groove formed by materials $T_1$ and $T_2$ to be welded. When the oscillation is started at the point A and the electrode is oscillated at the counter-clockwise direction, a certain prescribed base welding current is applied while the electrode pursues the course $\overline{AB}$ along the bottom side of the delta extending from the point A to the point B, and a higher current is applied when the electrode reaches the point B where it shifts from the bottom side $\overline{AB}$ to an oblique side $\overline{BC}$ corresponding to the groove face of one material $T_1$ to be welded and application of this high current is continued while the electrode is pursuing the course $\overline{BC}$. Application of this high current is further continued while the electrode is pursuing the course corresponding to an oblique side $\overline{CA}$, and at the point A where the electrode shifts from the oblique side $\overline{CA}$ to the bottom side $\overline{AB}$, application of the additional current which has been added to the base welding current is stopped and the welding is conducted with the base welding current alone. With respect to each cycle of oscillation, the above procedures are repeated. In practicing the above embodiment, the same high current can be applied during both courses along oblique sides $\overline{BC}$ and $\overline{CA}$, or different high currents can be applied during the courses along oblique sides $\overline{BC}$ and $\overline{CA}$, respectively. In the foregoing embodiment, a higher current is applied during both courses along oblique sides $\overline{BC}$ and $\overline{CA}$, but it is possible to apply such high current during only one of the above two courses. At any rate, in this invention it is indispensable that current higher than the base welding electric current should be applied during at least one of the foregoing courses of oscillation corresponding to the groove faces of the materials to be welded.

This invention will now be described in detail by reference to Examples and a Comparative Example illustrating the conventional method.

COMPARATIVE EXAMPLE

Figure 2:
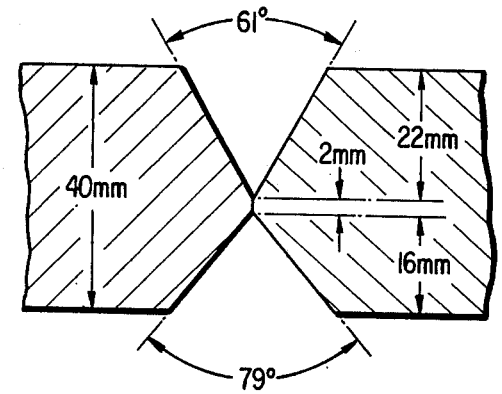
FIG. 2 is a view illustrating the groove shape and size of a base metal used in Examples of the method of this invention.
Figure 3:
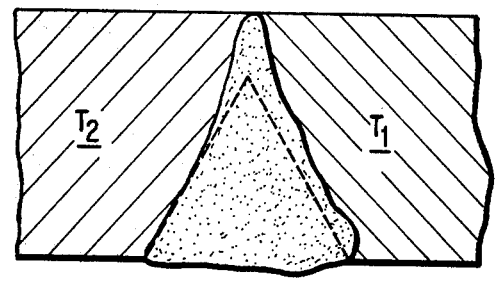
FIG. 3 is a sectional view showing the state of penetration attained according to the conventional method.

Material to be welded: JIS H 4000 (1970), A-5083-0, 40 mm in thickness
Wire: JIS Z 3232 (1970), A-5183-WY, 1.6 mm in diameter
Groove shape: X-groove (see FIG. 2)
Welding current: 300 A
Welding voltage: 26.5 V
Welding speed: 6 cm/min
Oscillating pattern: delta
Oscillating frequency: 54 cycles per minute Under the above welding conditions, the groove (V-groove) on each side of the X-groove was welded according to the conventional method, namely by applying a constant electric current and stopping for 0.1 to 0.3 second at each apex of the delta. As a result, poor non-uniform penetration was observed on the return side of the delta (side $\overline{CA}$ in FIG. 1) as shown in FIG. 3. Dotted lines in FIG. 3 show the groove faces before the welding.

EXAMPLE I

Figure 4:
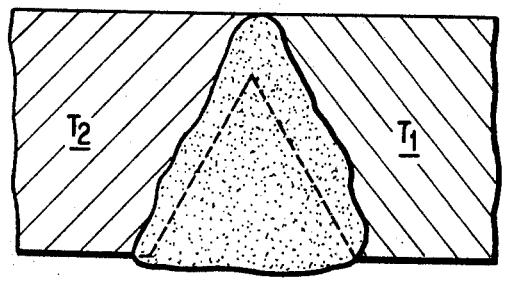
FIG. 4 is a sectional view showing the state of penetration attained according to the method of this invention.

The welding was conducted under the same conditions as adopted in the Comparative Example except that during the courses along the groove faces an additional current of 30 A was added to the base welding current of 300 A according to the method of this invention. Such defects as insufficient penetration and non-uniform penetration were eliminated and good penetration, as shown in FIG. 4, was attained. Dotted lines in FIG. 4 show the groove faces before the welding.

EXAMPLE II

Material to be welded: JIS H 4000 (1970), A-5083-0, 60 mm in thickness
Wire: JIS Z 3232 (1070), A-5183-WY, 1.6 mm diameter
Groove shape: as indicated by dotted lines in FIG. 5.

With respect to layers 1 and 2, the welding was conducted according to the direct current, straight polarity TIG welding method using an electrode of a diameter of 6.4 mm. The welding current applied was 600 A and the voltage was 13 V. The welding speed was 6 cm/min. As the shield gas, helium flowed at a rate of 30 l/min on the inner side and argon flowed at a rate of 30 l/min on the outer side.

In the welding of layers 3 and 4, a welding current of 300 A was applied at a voltage of 32 V during courses $\overline{AB}$, $\overline{BC}$ and $\overline{CD}$ and a welding current of 260 A was applied at a voltage of 28 V during the course $\overline{DA}$. The size of oscillation was such that each of courses $\overline{AB}$ and $\overline{CD}$ was 12 mm and each of courses $\overline{BC}$ and $\overline{DA}$ was 8 mm. The oscillating frequency was 70 cycles per minute. As the shielding gas, helium flowed at a rate of 30 l/min on the inner side and at a rate of 100 l/min on the outer side.

In welding of layers 5 and 6, the welding electric current was 260 A, the welding voltage was 27 V, and the welding speed was 12 cm/min. The oscillating size was such that the course $\overline{EF}$ was 13 mm, and the oscillating frequency was 80 cycles per minute. As the shielding gas, argon flowed at a rate of 30 l/min on the inner side and at a rate of 100 l/min on the outer side.

Figure 5:
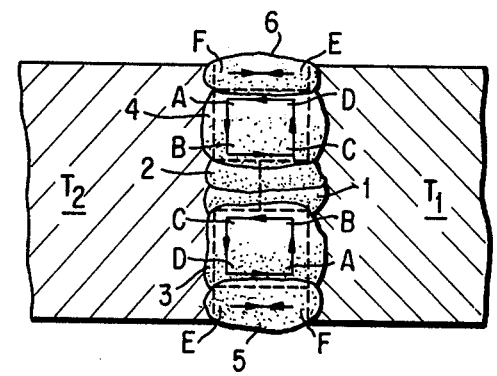
FIG. 5 is a view illustrating the groove shape of a base metal used in Examples of this invention and the courses of oscillation of the top end of an electrode.

When the welding was conducted under the above welding conditions, such defects as insufficient penetration and non-uniform penetration were not observed, and good penetration, as shown in FIG. 5, was attained.

In the case of a wire of a diameter of 1.6 mm, no substantial effect over the Comparative Example is attained when the additional current is lower than 10 A, and when the additional current exceeds 100 A, such defects as burn-through and sagging of the bead are created and good weldability cannot be attained. Accordingly, in the case of a wire of a diameter of 1.6 mm, good results are obtained when the additional current is 10 to 100 A. A preferred additional current varies depending on the wire diameter, and it is 10 to 70 A in the case of a wire diameter of 1.2 mm, and 30 to 150 A in the case of a wire of a diameter of 2.4 mm. Accordingly, the additional current should be selected from currents of 10 to 150 A appropriately depending on the wire diameter. It is generally preferred that the additional current be within a range of 30 to 70 A.

Effects attaind in the foregoing Examples I and II are attainable only when the welding method of this invention is applied to aluminum and aluminum alloys in which, because of high thermal conductivity, local heating is much more difficult than in steels. Owing to this peculiar property of aluminum and aluminum alloys, such defects or troubles as shown in the Comparative Example are brought about in the conventional welding method and are readily formed in the weld metal. Therefore, in the conventional method the oscillating speed should be increased so as to reduce occurrence of these defects, and especially micro-cracks. However, increase of the oscillating speed results in the further problem of insufficient penetration. In the case of steels, however, since local heating can be accomplished very easily even at a low oscillation speed, good penetration can be obtained even without adopting a special welding method, as shown in Examples I and II. Elevation of the current applied is not preferred in the case of steels because the heat input is increased and the width of the heat affected zone is broadened, resulting in increase of the degree of brittleness.

Therefore, application of the welding method of this invention, characterized by elevating the current at the innermost portion of the groove or on the side of the groove face, is limited to welding metals in which poor penetration, readily caused because of high thermal conductivity and brittleness at the heat affected zone, is of no significance, such as aluminum and aluminum alloys.

Figure 7A:
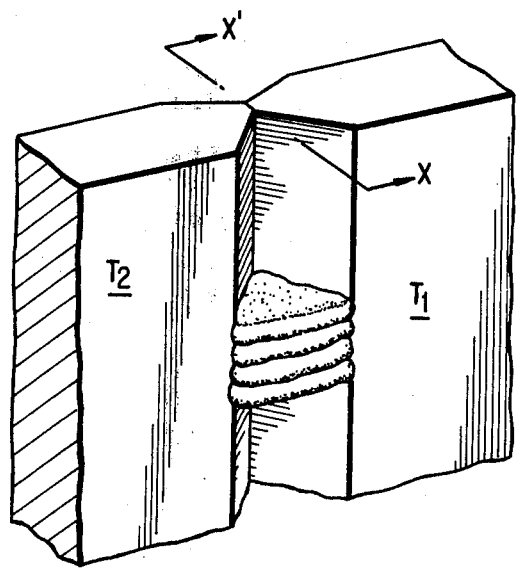
FIG. 7a and FIG. 7b are views showing angles of the top end of an electrode to the center of the molten metal.
Figure 7B:
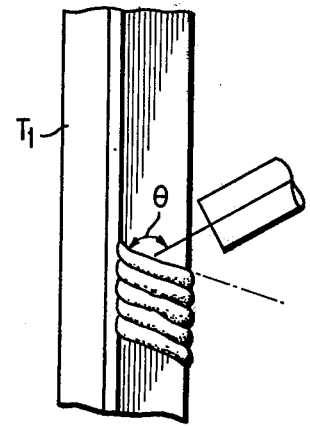

In one preferred embodiment of the welding method of this invention, the angle $\theta$ of the electrode with respect to the molten metal surface on the center of the groove is maintained at 90° or larger, as shown in FIGS. 7a and 7b. In this embodiment, good weld penetration can be stably obtained even in the innermost portion of the groove. When this angle $\theta$ is smaller than 90°, sufficient penetration cannot be obtained on the groove wall or at the innermost portion of the groove.

Figure 6:
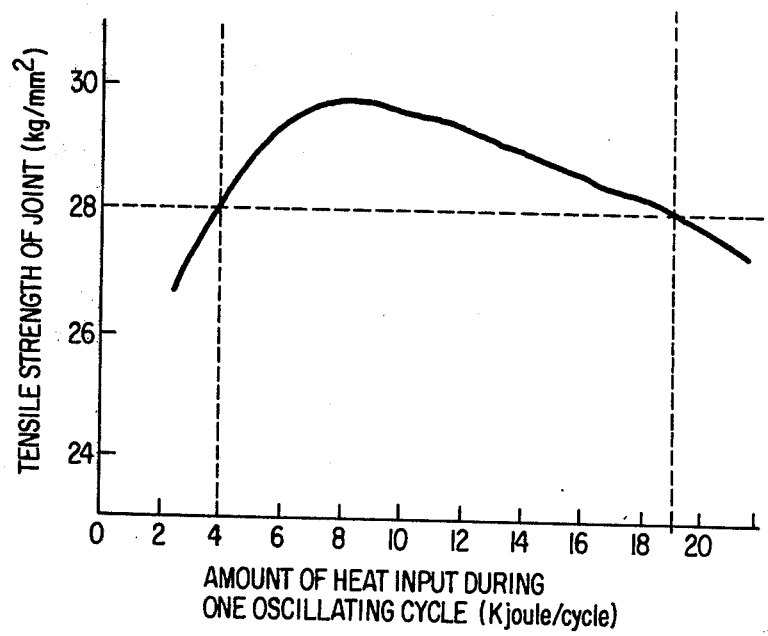
FIG. 6 is a graph illustrating the relation of the amount of heat input during one cycle of oscillation and the tensile strength of the joint.

It is preferred that the heat generated during one cycle of oscillation be 4 to 19 kilojoules. When the arc heat is lower than 4 kilojoules per cycle, because of insufficient heat input, the base metal is not sufficiently pre-heated and insufficient penetration or insufficient melting is readily caused to occur. Furthermore, the moving speed of the electrode becomes too high, resulting in an unstable operation of the art. Accordingly, from the practical viewpoint, such low arc heat is not preferred. In contrast, if the arc heat exceeds 19 kilojoules, the input heat becomes too large and the base metal is excessively heated, with the result that the amount of deposited metal obtained during one cycle of oscillation becomes too large and formation of micro-cracks cannot be prevented. From FIG. 6 showing the relation between the amount of heat input during one cycle of oscillation and the tensile strength of the joint, it will readily be understood that it is preferred that the heat generated during one cycle of oscillation be 4 to 19 kilojoules.

It is preferred that the oscillating frequency be 30 to 120 cycles per minute, although the preferred oscillating frequency varies to some extent depending on the above-mentioned amount of heat input. If the oscillating frequency is lower than 30 cycles per minute, the amount of metal deposited per cycle becomes too large and micro-cracks are readily formed. When the oscillating frequency exceeds 120 cycles per minute, the heat input becomes insufficient, resulting in insufficient penetration.

It is also preferred that the angle of the electrode with respect to the plane perpendicular to the welding line be not greater than 5° in the portion below the plane perpendicular to the welding line and not greater than 30° in the portion above the plane perpendicular to the welding line. If the electrode is inclined with an angle exceeding 5° in the portion below the plane perpendicular the welding line the arc does not reach to the innermost portion and sagging occurs, and if the electrode is inclined with an angle exceeding 30° in the portion above the plane, poor penetration of the groove faces is caused to occur.

Furthermore, it is preferred that the moving speed of the electrode be 2 to 15 m/min. At a moving speed lower than 2 m/min, microscopic defects are formed in the interior of the weld metal and the amount of the weld metal under the arc increases and fusion with the base metal is inhibited. At a moving speed exceeding 15 m/min, the arc becomes unstable during the welding. As is apparent from the foregoing illustration, this invention provides a method of vertical welding of aluminum and aluminum alloys which can highly improve insufficient weld penetration on the groove surface which inevitably occurs in the conventional MIG welding and which can provide welded structures free of welding defects as observed in the conventional MIG welding method.

Obviously, many modifications and variations of this invention are possible in light of these teachings. It is to be understood therefore that within the scope of the appended claims, the present invention may be practiced otherwise than as specifically described herein.

What is claimed to be new and intended to be covered by Letters Patent is:

1. A method of vertical welding of aluminum and aluminum alloys comprising:

welding aluminum or an aluminum alloy with at least a base welding current while oscillating in a welding groove an electrode in a closed pattern corresponding substantially to the groove shape, wherein the welding is conducted by using an additional current higher by 10 to 150 A than said base welding current at least during the course of oscillation of the electrode along the groove face of one of the materials to be welded while the electrode is pursuing courses of oscillation along both the groove faces of the materials to be welded.

2. A welding method according to claim 1 wherein: the welding is conducted by using a welding current higher by 10 to 150 A than said base welding electric current throughout the courses of oscillation of the electrode along all the groove faces of the materials to be welded while the electrode is pursuing the courses of oscillation.

3. A welding method according to claim 2 wherein during the courses of oscillation of the electrode along all the groove faces of the materials to be welded the welding is conducted by using a welding current higher by 30 to 70 A than the current applied during the course of oscillation of the electrode along the open side of the groove.

4. A welding method according to claim 3 wherein the amount of arc heat input during one cycle of oscillation of the electrode is 4 to 19 kilojoules and the oscillation frequency is 30 to 120 cycles per minute.

5. A welding method according to claim 1 wherein the angle formed between the electrode and the molten face on the innermost side of the groove is at least 90°.

6. A welding method according to claim 1 wherein: the angle of the electrode with respect to a plane disposed perpendicular to the welding line is within the range of not greater than 5° in the portion below the plane and not greater than 30° in the portion above the plane.

7. A welding method according to claim 1 wherein the electrode is moved at a speed of 2 to 15 m/min.

* * * * *